Aug. 28, 1923.  
R. DE H. ST. STEPHENS ET AL  
1,466,516  
PERCUSSIVE ROCK DRILL AND THE LIKE  
Filed April 26, 1921
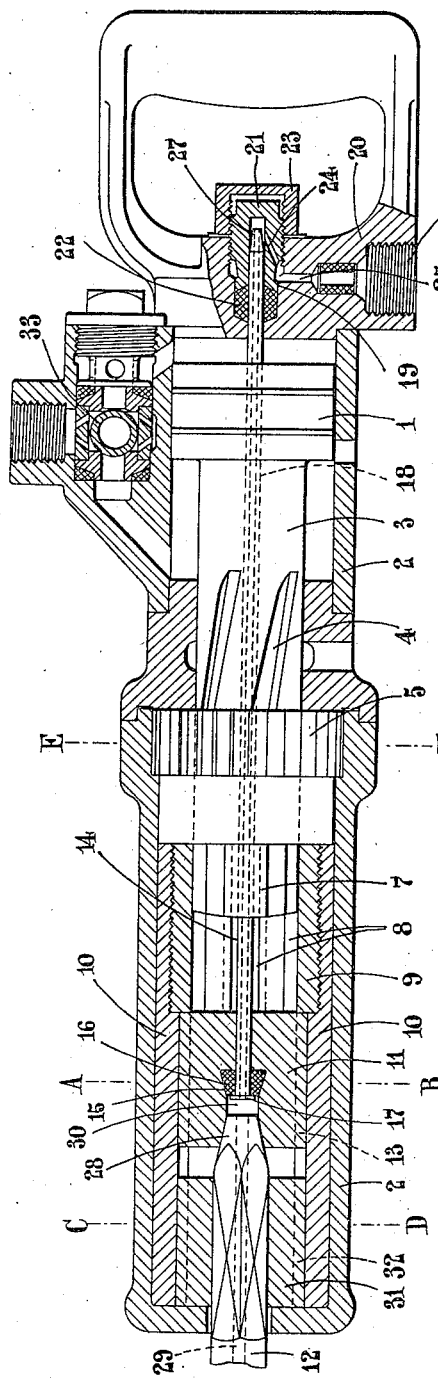
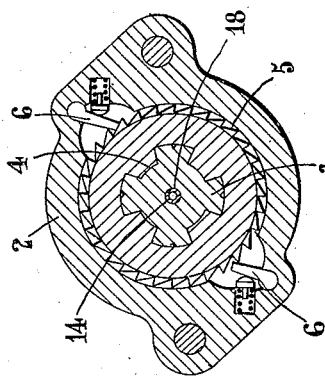
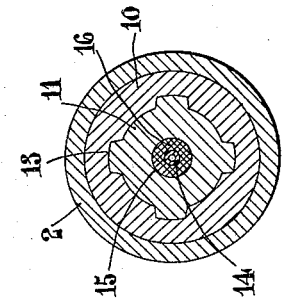

Patented Aug. 28, 1923.

1,466,516

UNITED STATES PATENT OFFICE.

RAYNAR DE HELE ST. STEPHENS, OF CAMBORNE, AND ALFRED EWING, OF LONDON, ENGLAND.

PERCUSSIVE ROCK DRILL AND THE LIKE.

Application filed April 26, 1921. Serial No. 464,593.

*To all whom it may concern:*

Be it known that we, RAYNAR DE HELE ST. STEPHENS, of Homefield, Camborne, Cornwall, England, and ALFRED EWING, of 4 Broad Street Place, London E. C. 2, England, both subjects of the King of Great Britain, have invented certain new and useful Improvements in Percussive Rock Drills and the like, of which the following is a specification.

This invention relates to percussive rock drills and the like wherein water is conveyed under pressure through a tube to the hollow drill steel, the flow of water serving to remove débris from the hole which is being drilled, and to prevent the formation of dust and so forth. It is the object of this invention to improve the construction of such drills particularly in regard to the feed of water by preventing any admixture of air with the water, so that atomization or spraying is prevented, and the flushing out of the hole by the water is rendered more efficient. In the improved construction according to this invention the tube conveying the water to the drill steel is arranged coaxially with the drill steel and the piston, and is held fixed in the anvil block into which the head of the drill steel fits, while the piston slides over the tube, and the end of the tube beyond the piston works through packing in a gland. With this construction the water flows through a closed tubular path to the drill steel, and any entrance of air into the tube, or leakage of water therefrom is prevented.

In the accompanying drawing:

Figure 1 is a longitudinal section of a percussive rock drill provided with the water supplying means according to the invention.

Figure 2 is a section on the line A—B of Figure 1.

Figure 3 is a section on the line C—D of Figure 1, and

Figure 4 is a section on the line E—F of Figure 1.

It will be convenient to describe the invention as applied to a percussive rock drill of a known type wherein a pneumatically operated piston 1 working in a cylinder 2 has a rod 3 or extension 3 formed with spiral grooves at 4 which engage with a nut formed internally in the member 5. This member 5 is prevented from rotation on the forward movement of the piston 1 by means of spring actuated pawls 6, Figure 4, engaging with the toothed rim thereof. At its forward end the rod 3 is provided at 7 with straight grooves with which are adapted to engage castellations or ribs 8 formed in a nut 9. This nut is screwed into the bush 10 which accommodates the anvil block 11 and the head of the drill steel 12.

In a drill of this character the anvil block 11 which fits by castellations 13 or otherwise into grooves in the rotating bush 10, has the forward end of the tube 14 conveying the water securely held therein. For this purpose the anvil block 11 is drilled through from the rear and has a conical recess at 15 therein in which is fitted a thick tapering washer 16 of rubber or the like which holds the tube 14 securely but resiliently. The water tube 14 is passed through this rubber washer 16 so that its head 17 bears against the same, and the tube 14 is thus packed in a fluid-tight manner in the anvil block 11. The tube 14 projects rearwardly from the anvil block 11 through the central bore 18 of the piston rod 3 and the piston 1 and into a stuffing box 19 in the handle section 20 of the tool. In this stuffing box is a gland 21 with suitable packing material 22 through which the tube 14 can slide in a fluid-tight manner. The end of the stuffing box 22 is closed by a suitable cap 23 which is adapted to screw over the end of the gland 21. Water is conveyed to the inner end of the gland 21 by an inclined passage way formed at 24 therein, this passageway leading to a lateral passage at 25 in the handle portion 20 communicating with a socket 26 to which a water hose pipe can be connected. In order to prevent the end of the tube 14 from closing the outlet end of the passageway 24 in the gland 21, the end of the tube is preferably tapered as shown at 27.

At the forward end of the anvil block 11 is a conical or tapering recess into which the tapered end 28 of the drill steel 12 fits, thus making a water-tight joint with the block 11. The bore 29 of the drill steel 12 for the passage of water thus comes opposite to the end of the tube 14 fixed in the anvil block 11 and as there is no relative movement between these parts while the drill is in use, the short gap at 30 between the end of the tube 14 and the bore 29 of the drill steel 12 becomes filled with water, so that a continuous flow of water from the tube 14 through the drill steel 12 and the drill bit can be maintained. No air can become intermingled with the water and atomization is thus effectively prevented. The flow of water is maintained under pressure, so that there is a steady flow through the hole being drilled, keeping it cleared of débris and rendering the operation of the drill more effective. The anvil block 11 may be rotated by means of its castellations 13 of other connexions with the tool holder, and the drill steel may be rotated by the anvil block 11 by means of the tapered portion 28 of its shank fitting therein. The shank of the drill steel 12 may be made square and may pass as shown through a tool holder 31 mounted in the rotating bush 10, this tool holder having a square hole broached through it, and being formed externally with castellations 32 or otherwise for engagement with the rotating bush 10 while allowing of longitudinal reciprocating movement.

The operation of a percussive rock drill as hereinbefore described is as follows:—

The piston 1 is operated in the usual manner by compressed air of which the passage into the cylinder 2 is controlled by a valve 33 in the well known manner. On the forward movement of the piston 1 the nut 5 will be allowed to turn by the pawls 6 so that the piston will carry out its forward stroke without turning itself or the sleeve 10. Towards the end of the forward movement the piston rod 3 will strike the anvil block 11 and thus impart a blow to the drill steel 12. On the return stroke of the piston 1, the piston will be turned as its grooves 4 engage with the nut inside the member 5 which is prevented from turning by the pawls 6. The forward end of the piston rod 3 which engages with the nut 9, will thus turn the nut 9 and consequently also the sleeve 10, which in its turn rotates the anvil block 11 and the tool holder 31. On the succeeding strokes of the piston the operations described above will be repeated.

The invention is not limited in its application to any particular type of percussive drill, but it can be applied to the drills and similar tools in which the movement is imparted to the steel bit 12 by pneumatic or other mechanism the arrangement always being such that the water tube 14 is held securely as by the rubber washer 16 in the anvil block 11 or its equivalent into which the head 28 of the drill steel 12 fits, while the other end of the tube 14 slides through a gland allowing of longitudinal and rotating movement, the water being fed in continuously to this end of the tube beyond the gland.

Having thus described our invention what we claim as new and desire to secure by Letters Patent is:—

1. A percussive rock drill comprising a cylinder with a handle portion, a piston with a central bore adapted to work in said cylinder, means for controlling the supply of fluid for operating said piston, a drill steel having a central bore and a tapered head, said drill steel being mounted in said cylinder, an anvil block slidably mounted in the cylinder between the piston and the drill steel and adapted to receive the tapered head of the drill steel, a stuffing box and gland in the handle portion, a tube passing concentrically through the anvil block and having one end secured thereto, said end being adjacent the central bore in the drill steel, said tube being adapted to slide through the central bore of the piston, whilst its other end is adapted to slide through the gland, and means for supplying liquid to the end of the tube sliding through the gland.

2. A pneumatic rock drill comprising a cylinder with a handle portion, a piston with a central bore working in said cylinder, means for controlling the supply of fluid for operating said piston, a drill steel having a central bore and a tapered head, said drill steel being mounted in said cylinder, an anvil block with a central bore slidably mounted in said cylinder, said anvil block being provided with a conical recess merging into an undercut recess in which the central bore terminates, the conical recess being adapted to receive the tapered head of the drill steel, a thick tapered washer in the undercut recess, a tube passing through the central bore of the piston and the anvil block and having one end passing through a washer which holds the tube securely but resiliently, a packing gland in the handle portion through which the other end of said tube works, and means for supplying a liquid under pressure to the gland.

3. A pneumatic rock drill comprising a cylinder with a handle portion, a piston with a central bore working in said cylinder, means for controlling the supply of fluid for operating said piston, said piston having spiral grooves therein, axial ribs on said piston, a member having a toothed periphery mounted in said cylinder, ribs on the inner surface of said member adapted to engage with the spiral grooves in the piston, a bush with internal grooves mounted in the cylinder, a nut screwing into the bush and having straight grooves in the interior thereof for engagement with the axial ribs on the piston, an anvil block with a central bore mounted in said bush, ribs on said anvil block for engagement with the grooves in the bush, a stuffing box and gland in the handle portion, a tube passing through the anvil block and having one end secured thereto, said end being adjacent the central bore in the drill steel, said tube being adapted to slide through the central bore of the piston, whilst its other end is adapted to slide through the gland, and means for supplying liquid to the end of the tube sliding through the gland.

4. A pneumatic rock drill comprising a cylinder with a handle portion at one end thereof, a piston adapted to work in said cylinder, means for controlling the supply of fluid for operating said piston, a piston rod, said piston and piston rod each having a central bore, a bush with internal grooves rotatably mounted in said cylinder, means for rotating the bush on the movement of the piston in one direction, a tool holder with a rectangular hole mounted in said bush, ribs on said tool holder engaging with the grooves in the bush, a drill steel having a rectangular portion for engagement with the rectangular hole in the tool holder, said drill steel having a central bore, an anvil block with a central bore, ribs on said anvil block for engagement with the grooves in the bush, said anvil block being provided with a conical recess emerging into an undercut recess in which the central bore terminates, the conical recess being adapted to receive the tapered head of the drill steel, a thick tapered washer in the undercut recess, a tube passing through the central bore of the piston and the anvil block and having one end passing through the washer which holds the tube securely but resiliently, said tube having one end adjacent the central bore in the drill steel, a packing gland in the handle portion, the tube being adapted to pass through the central bore of the piston and piston rod and working in said packing gland, a cap covering the end of the packing gland, and means for supplying liquid under pressure to said gland.

RAYNAR de HELE ST. STEPHENS.
ALFRED EWING.